Patented Apr. 24, 1934

1,955,885

UNITED STATES PATENT OFFICE 1,955,885

UNCATALYZED OXIDATION OF ACETYLENE

Samuel Lenher, Wilmington, Del., and George B. Kistiakowsky, Cambridge, Mass., assignors to E. I. du Pont de Nemours & Company, Wilmington, Del., a corporation of Delaware No Drawing. Application December 3, 1930, Serial No. 499,848

5 Claims. (Cl. 260—116)

This invention relates to the homogeneous oxidation of acetylene and to the reaction products, including glyoxal, formaldehyde, and formic acid, which are produced by this reaction.

The prior art dealing with the homogeneous reaction of acetylene and oxygen is not large. The most recent development in this line is that disclosed in U. S. Patent No. 1,741,394 in which it is alleged that acetylene and ordinary oxygen are reacted at high velocity to form glyoxal alone. The amounts of glyoxal produced by the said patented system are apparently minute because it is necessary, according to the disclosure, to recirculate the reacting materials many times before the glyoxal attains a concentration sufficient to be removed.

This invention has as an object the oxidation of acetylene by direct homogeneous reaction with ordinary oxygen and the production by this reaction of glyoxal, formaldehyde and formic acid. Another object is to improve prior methods of reacting acetylene and oxygen.

These objects are accomplished by passing a mixture containing acetylene and oxygen at a comparatively low velocity through a reaction tube heated to a temperature sufficient to cause the reaction to proceed but insufficient to cause an explosion of the mixture.

In the practice of our invention we pass oxygen and acetylene at atmospheric pressure through a heated reaction vessel at a relatively low velocity.

The reacting vessel is preferably of siliceous material such as glass or porcelain but may be of metal. If a metal reaction vessel is used, it should preferably be non-ferrous. The vessel should preferably be of relatively large size because it is generally possible to use lower temperatures in large vessels. The size of the vessel, furthermore, affects the nature of the reaction and the rate at which it proceeds.

The reaction must be carried out at an elevated temperature and, to obtain considerable results, should be carried out at a temperature above about 200° C. Above temperatures about 220° C. under the conditions of our experiments the yield of desirable ingredients increases sharply with the increase in temperature. The infinitesimal yields in the cited patent may be due to a failure to carry out the reaction at elevated temperatures.

We have discovered that the yields of all products increase with the time of contact and that, therefore, the reaction is preferably carried out at relatively low velocity. Velocities which insure that the reacting gases will remain in the heated zone for periods from a few seconds to several hundred seconds have been found satisfactory. It is not possible to give a mean time for the presence of the reacting gases in the heated zone or to give a velocity in cubic centimeters per second because these factors vary with the size and material of the reacting vessel, with the concentration of the reactants and their relative proportions, and with the temperature and pressure at which the reaction is carried out.

The reacting vessel may be heated by any suitable method and the temperature of the reacting vessel measured by any suitable temperature-recording device. In the examples below the reacting vessel was heated in an electric tube furnace and the temperature was measured by means of a thermocouple enclosed in a thin-walled glass tube in the center of the reaction vessel.

The following examples illustrate the effect of the various factors upon the reaction.

EXAMPLE I

*Effect of temperature*

Average time of contact=200 seconds.
360 volumes of 1$C_2H_2$:1$O_2$ mixture.
Glass reaction vessel.

| Temperature | Percent of total carbon passed | | | Percent $H_2$ formed |
|---|---|---|---|---|
| | CO | $CO_2$ | Formic acid, formaldehyde and glyoxal | |
| 255° | 0.49 | 0.18 | 0.63 | 0.16 |
| 277 | 1.71 | .43 | 1.5 | .48 |
| 297 | 6.4 | 2.1 | 4.7 | 1.2 |
| 316 | 16.3 | 4.5 | 8.4 | 2.9 |

From this example it will be seen that the main products of acetylene oxidation under these conditions are the liquid products (formic acid, formaldehyde, glyoxal), carbon monoxide, and carbon dioxide. The amount of hydrogen freed is not important. The yield of desirable products increases sharply with increasing temperature in this range. The per cent of total carbon which went into formic acid, formaldehyde, and glyoxal, is gathered together, for convenience, in column 4. Determination of formaldehyde and formic acid showed that 55% of the substances recorded in that column was formic acid and that 10% was formaldehyde.

EXAMPLE II

*Effect of time of contact*

| Temp. | Time of contact in seconds | Percent of total carbon passed ||||| Percent H₂ formed |
|---|---|---|---|---|---|---|
| | | CO | CO₂ | Formic acid, formaldehyde and glyoxal | Formic acid alone | |
| 278° | 200 | 2.67 | 0.49 | 2.8 | | .41 |
| 278 | 100 | .49 | .12 | 1.33 | | .31 |
| 278 | 50 | .20 | .01 | .48 | | .18 |
| 310 | 200 | 15.3 | 3.0 | 6.7 | 4.9 | 1.6 |
| 310 | 100 | 11.0 | 1.8 | 4.8 | 3.1 | 1.9 |
| 310 | 50 | 2.01 | .55 | 2.6 | 1.33 | 1.0 |

The experiments summarized in Example II show that the yields of all products increase with increasing time of contact. The yields of the various reaction products are not affected in the same way. The amount of carbon dioxide increases most rapidly, then the carbon monoxide, while the yield of hydrogen and the liquid products increases only slightly. A determination of aldehydes (formaldehyde and glyoxal) carried out on a sample of liquid products obtained with 50 seconds contact time yielded 30% of aldehydes as compared with 9% obtained with 200 seconds contact time. This appears to support the theory that the reaction products are not all formed in the primary reaction. It tends to show that the liquid products, and possibly hydrogen, are the first products of the oxidation of acetylene, while carbon monoxide and dioxide result from secondary decomposition or oxidation of the first formed products.

EXAMPLE III

The influence of gas composition on the reaction, and on the rate of reaction was indicated by experiments which, summarized below, show that the rate of reaction increases rapidly with an increasing ratio of acetylene to oxygen. The average time of contact was 200 seconds in each experiment.

| Series | Temp. | Composition of reaction mixture ||| Percent of total carbon passed ||| Percent H₂ formed |
|---|---|---|---|---|---|---|---|---|
| | | C₂H₂ | O₂ | N₂ | CO | CO₂ | Formaldehyde, formic acid and glyoxal | |
| A | 278° | 75% | 25% | | 4.25 | 0.87 | 4.14 | 0.52 |
| | 279 | 75% | 25% | | 4.35 | .85 | 4.38 | .48 |
| | 277 | 25% | 75% | | 1.35 | 0.47 | 1.05 | 0.22 |
| | 278 | 25% | 75% | | 0.67 | .34 | 1.75 | .22 |

The average increase of the two main products (liquid matter and carbon monoxide) is about tenfold for the changes in composition above, or is a threefold change to each of the reactants.

EXAMPLE IV

*Effect of surface area*

The influence of the walls of the reaction vessel on the reaction was studied by running the reaction in "Pyrex" tube filled with broken "Pyrex" glass of a size between 6 and 4 mesh. The packed vessel was treated with a normal solution of sodium chloride, washed, and dried. A remarkable feature of these experiments is that they indicate a reaction rate in the packed vessel manyfold slower than in the empty one. Variation of the composition of the gas mixture in the packed vessel leaves the rate of reaction practically unchanged. The time of contact also does not appear to materially affect the rate of reaction in the packed vessel.

It is clear, consequently, that the reaction of acetylene with oxygen on a surface yields carbon monoxide and carbon dioxide directly, whereas in the reaction of acetylene with oxygen in space the primary reaction appears to produce carbon monoxide and liquid products. From this it is clear that the reaction which occurs upon a surface is different from that which occurs in space, the products of the former being undesirable and the products of the latter being highly useful.

The results which are herein set forth would be explained by the following series of reactions although it must be remembered that this is theory only and that the patent is not to be thereby limited:

The oxidation of acetylene and oxygen proceeds first to the formation of glyoxal:—

(A) 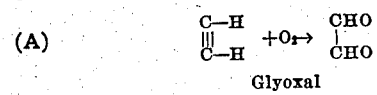

Glyoxal

Thereafter some glyoxal in the presence of heat forms formaldehyde, carbon monoxide, and hydrogen:—

(B) 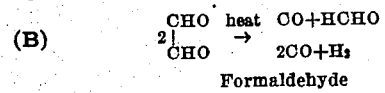

Formaldehyde

Some of the formaldehyde formed in reaction B then reacts with oxygen to yield formic acid:—

(C) 

Formic acid

Some of the formic acid in turn reacts with oxygen to form carbon monoxide, carbon dioxide, and water:—

(D) 

The process just described may be carried out as a batch or a continuous process and can be carried out at atmospheric pressure, at lower pressures, or at higher pressures.

This process is useful for the production of glyoxal, formaldehyde, and formic acid. Glyoxal from this process is useful in the manufacture of tartaric acid and tartrates, the manufacture of glycollic acids and glycollates, in the synthesis of indigo, and in the production of ethylene glycol.

Among the advantages of this process over the prior art are the production of valuable chemical compounds by the direct homogeneous oxidation of acetylene, the production of certain of these compounds in increased yields, and the advantage of the carrying out of the reaction at an elevated temperature and at a low velocity, and the production of glyoxal, formaldehyde, and formic acid.

As many apparently widely different embodiments of this invention may be made without departing from the spirit and scope thereof, it is to be understood that we do not limit ourselves to the specific embodiments thereof except as defined in the appended claims.

We claim:

1. The method of reacting acetylene with oxygen which comprises passing a mixture of acetylene and oxygen through a reaction tube heated to a temperature between 200° C. and the explosion temperature of the mixture.

2. The method of reacting acetylene with oxygen which comprises slowly passing a mixture of acetylene and oxygen through a heated reaction tube.

3. The method of reacting acetylene with oxygen which comprises passing a mixture of approximately equal amounts of acetylene and oxygen through a heated reaction tube.

4. The method of homogeneously reacting acetylene with oxygen which comprises passing a mixture containing a greater concentration of acetylene than oxygen through a reaction tube heated to a temperature between 200° C. and the explosion temperature of the mixture.

5. The method of reacting acetylene with oxygen which comprises passing a mixture of acetylene and oxygen at low velocity through a reaction tube heated to a temperature above about 275° C.

SAMUEL LENHER.
GEORGE B. KISTIAKOWSKY.